(12) United States Patent
Benedikt (10) Patent No.: US 7,895,449 B2
(45) Date of Patent: Feb. 22, 2011

(54) SYSTEM AND METHOD FOR SECURELY DELIVERING INSTALLATION KEYS TO A PRODUCTION FACILITY

(75) Inventor: Mark Benedikt, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 10/463,675

(22) Filed: Jun. 16, 2003

(65) Prior Publication Data

US 2005/0021962 A1 Jan. 27, 2005

(51) Int. Cl.
G06F 11/30 (2006.01)
(52) U.S. Cl. .................................... 713/191
(58) Field of Classification Search ............. 380/277; 713/189
See application file for complete search history.

(56) References Cited

U.S. PATENT DOCUMENTS

| | | | | |
|---|---|---|---|---|
| 5,553,143 | A * | 9/1996 | Ross et al. | 705/59 |
| 5,696,758 | A | 12/1997 | Yanagimachi et al. | |
| 5,903,650 | A * | 5/1999 | Ross et al. | 705/59 |
| 6,169,976 | B1 * | 1/2001 | Colosso | 705/59 |
| 6,212,158 | B1 | 4/2001 | Ha et al. | |
| 6,920,567 | B1 * | 7/2005 | Doherty et al. | 726/22 |
| 7,031,470 | B1 * | 4/2006 | Bar-On | 380/203 |
| 7,073,063 | B2 * | 7/2006 | Peinado | 713/171 |
| 7,216,235 | B1 * | 5/2007 | Platt | 713/182 |
| 2003/0163688 | A1 * | 8/2003 | Tanaka et al. | 713/161 |
| 2004/0151320 | A1 * | 8/2004 | Hitachi et al. | 380/277 |

FOREIGN PATENT DOCUMENTS

EP 0762392 B1 3/1997

OTHER PUBLICATIONS

Akkermans, T.H.M., and J.A.H. Kahlman, "Chip in Disc for Optical Storage," *Proceedings of the Joint International Symposium on Optical Memory and Optical Data Storage*, Waikoloa, Hawaii, Jul. 7-11, 2002, pp. 3-5.

Augot, D., et al., "Secure Delivery of Images Over Open Networks," *Proceedings of the IEEE* 87(7):1251-1266, Jul. 1999.

Chen, D., "Status of Optical Disk Standards and Copy Protection Technology," *Proceedings of the SPIE-The International Society for Optical Engineering*, Taipei, Taiwan, Jul. 26-27, 2000, vol. 4081, pp. 8-16.

(Continued)

*Primary Examiner*—Nasser Moazzami
*Assistant Examiner*—Daniel L Hoang
(74) *Attorney, Agent, or Firm*—Vierra Magen Marcus & DeNiro LLP (57) ABSTRACT

A system and method for securely delivering installation keys from a key generator to an individualization device at a production facility is presented. Operators, using a production key server at the manufacturing facility, send a request to a key release server for a number of installation keys according to a production run. The key release server verifies the request, and if valid, returns the requested number of installation keys to the production key server in an encrypted format. The production key server then decrypts and delivers installation keys to the individualization device in a just-in-time fashion. The production key server includes various security devices including a hardware decryption device to decrypt the installation keys, a smart card reader for authenticating authorized operators, and a limiting switch to disable the production key server if it is tampered with.

71 Claims, 6 Drawing Sheets

OTHER PUBLICATIONS

Dejneka, M.J., et al., "Rare Earth-Doped Glass Microbarcodes," *PNAS* 100(2):389-393, Jan. 21, 2003.

England, P., and M. Peinado, "Authenticated Operation of Open Computing Devices," *Proceedings of the Information Security and Privacy 7th Australian Conference*, Melbourne, Australia., Jul. 3-5, 2002, pp. 346-361.

Galante Block, D., "Rallying the Disc Patrol: Protection Schemes for CD and DVD," *EMedia Professional* 11(12):34-38 and 40-43, Dec. 1998.

Mikic-Rakic, M., and N. Medvidovic, "Architecture-Level Support for Software Component Deployment in Resource Constrained Environments," *Proceedings of the Component Deployment, IFIP/ACM Working Conference, CD 2002*, Berlin, Germany, Jun. 20-21, 2002, pp. 31-50.

Miller, R., "The Many Faces of DRM: Delivering Secure Enterprise Content," *EContent* 25(10):Oct. 22-28, 2002.

Prostar, *Specifications: Data Streaming, Robotics, Printing*, Rimage Corporation, Minneapolis, Minn., 2001.

"SafeDisc Technical Overview," *SafeDisc Whitepaper*, Macrovision Corporation, Santa Clara, Calif., 2002, pp. 1-16.

Sjölin, M., "State Driven Software Installation for Windows NT," *Proceedings of the 2nd Large Installation System Administration of Windows NT Conference*, Seattle, Washington, Jul. 16-17, 1999, pp. 27-36.

Thorwirth, N. J., et al., "Security Methods for MP3 Music Delivery," *Conference Record of the 34th Asilomar Conference on Signals, Systems and Computers*, Oct. 29-Nov. 1, 2000, Pacific Grove, Calif, vol. 2, pp. 1831-1835.

Waller, A.O., et al., "Securing the Delivery of Digital Content Over the Internet," *Electronics & Communication Engineering Journal* 14(5):239-248, Oct. 2002.

Yeo, W.-S., and J.-S. Lee, "Feasibility of Edge Delay Symbols for Copy Protection in Optical disks," *Proceedings of the SPIE-The International Society for Optical Engineering*, Whistler, B.C., Canada, May 14-17, 2000, pp. 289-291.

Yoshioka, M., "IPR Protection Features for Optical Disks to Promote Superdistribution," *Proceedings of the Joint International Symposium on Optical Memory and Optical Data Storage*, Koloa, Hawaii, Jul. 11-15, 1999, vol. 3864, pp. 83-85.

\* cited by examiner

SYSTEM AND METHOD FOR SECURELY DELIVERING INSTALLATION KEYS TO A PRODUCTION FACILITY

FIELD OF THE INVENTION

The present invention relates to securely delivering digital installation keys to a manufacturing facility for placement on installation media.

BACKGROUND OF THE INVENTION

In today's society, computer software, as well as other digital content, has become extremely valuable. Unfortunately, due to the abilities of the computers upon which computer software is installed, computer software may be easily pirated. According to recent studies, losses resulting from pirated software in the United States are estimated in the billions of dollars each year. In response, software companies have responded with various anti-piracy measures to prevent such losses. Unfortunately, current efforts aimed at preventing these losses have been only marginally successful.

One current anti-piracy measure involves the use of installation keys. Content is delivered to a user on installation media in an installable format referred to as an installation image. The content is installed from the installation image via an installation process. The installation process is enabled and installs the content only when a valid installation key is presented. Thus, using a supplied installation key, the software, or other digital content, may be installed on a computer.

Currently, most software applications are delivered on mass-produced CD-ROMs. Accompanying the CD-ROM is an installation key that the user must manually enter during the installation process. The installation key is typically printed on a label and placed on printed material accompanying the CD-ROM. Installation keys represent encrypted tokens. The installation program decrypts the manually entered installation key to determine whether the key is a genuine, valid key. Incorrectly entering the installation key is interpreted as an invalid installation key and the installation process is aborted. However, if the installation key is genuine, and if the user correctly enters the installation key, the installation process continues with installing the computer software. Thus, it is essential that the installation key be properly entered.

Because the installation keys that are currently used must be manually entered through a keyboard by the user, they must be short, and therefore, are relatively weak in terms of their ability to be hacked or forged. However, shorter keys are used because studies have shown that the longer the installation key, the greater the user frustration becomes from entering it, and the more likely the user will err while entering the key. In today's competitive market, it is imperative to minimize user frustration and maximize accuracy in entering the installation key. Thus, to ensure a positive experience on the user's part, software vendors are forced to limit the length of installation keys, typically to under 30 characters. Unfortunately, the length of the installation key typically corresponds to the ease with which an installation key may be forged. Forged installation keys are a primary reason that current anti-piracy measures enjoy only limited success.

By increasing the length of the installation keys, and in particular the cryptographic bits of the installation keys, vendors could create installation keys sufficiently strong to prevent their forgery. For purposes of this discussion, a strong installation key is one that is not susceptible to encryption breaking processes using current or near future computer processing power. Taking into account the current processing power of computers today and the near future, a sufficiently strong installation key would include at least 512-bits of cryptographic data. A 512-bit cryptographic key roughly equates to 300 characters, about ten times the 30-character limit used today. However, requiring a user to manually enter a 300-character installation key is simply unreasonable.

One solution to this problem is proposed in the co-pending application "System and Method for Individualizing Installation Media," U.S. patent application Ser. No. 10/463,559, filed Jun. 16, 2003, which is incorporated herein by reference. According to this proposed solution, strong installation keys are written to the installation media in a computer-readable format. A strong installation key is one that is not susceptible to encryption breaking processes, taking into account current or near future computer processing power. For example, a sufficiently strong installation key may include at least 512-bits of cryptographic data. Instead of the user entering the installation key, the installation process reads the strong installation key from the installation media. Thus, long, and therefore strong, installation keys may be used without the problems associated with user generated input errors. Unfortunately, if pirates cannot forge counterfeit installation keys, they will likely turn to stealing genuine keys.

As previously mentioned, the installation media is typically mass-produced. Moreover, in order to minimize costs, content providers turn to third-party production facilities to mass-produce the media. Thus, genuine installation keys must be delivered to these third parties in order to place the keys on the installation media. This represents a weakness that may be exploited by thieves, stealing the genuine installation keys, either during their transit from the software vendor to the production facility, or while stored at the production facility.

Accordingly, the prior art lacks a system for delivering strong installation keys from a software vendor to an individualization device at a production facility in a secure manner. As will be discussed below, the present invention addresses this and other aspects currently lacking in the prior art.

SUMMARY OF THE INVENTION

A system for securely delivering an installation key to an individualization device is provided. The system includes an individualization device that writes an installation key onto an installation media. The system also includes a remote key generator that generates the installation keys to be written to the installation media. The system further includes a production key server that obtains an encrypted installation key from the key generator, decrypts the encrypted installation key, and delivers the decrypted installation key to the individualization device for writing the key onto the installation media.

According to additional aspects of the invention, the production key server obtains an encrypted installation key from the key generator system by sending a key request to a key release server. The key release server validates the request from the production key server to determine if it is authorized, and if the request is authorized, obtains an installation key from the key generator and sends the installation key to the production key server in an encrypted format.

A method for securely delivering an installation key to an individualization device is also provided. The method includes requesting an installation key, and receiving an encrypted installation key in response to the request. The method further includes decrypting the encrypted installation, and delivering the decrypted installation key to the individualization device for writing the installation key onto installation media.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
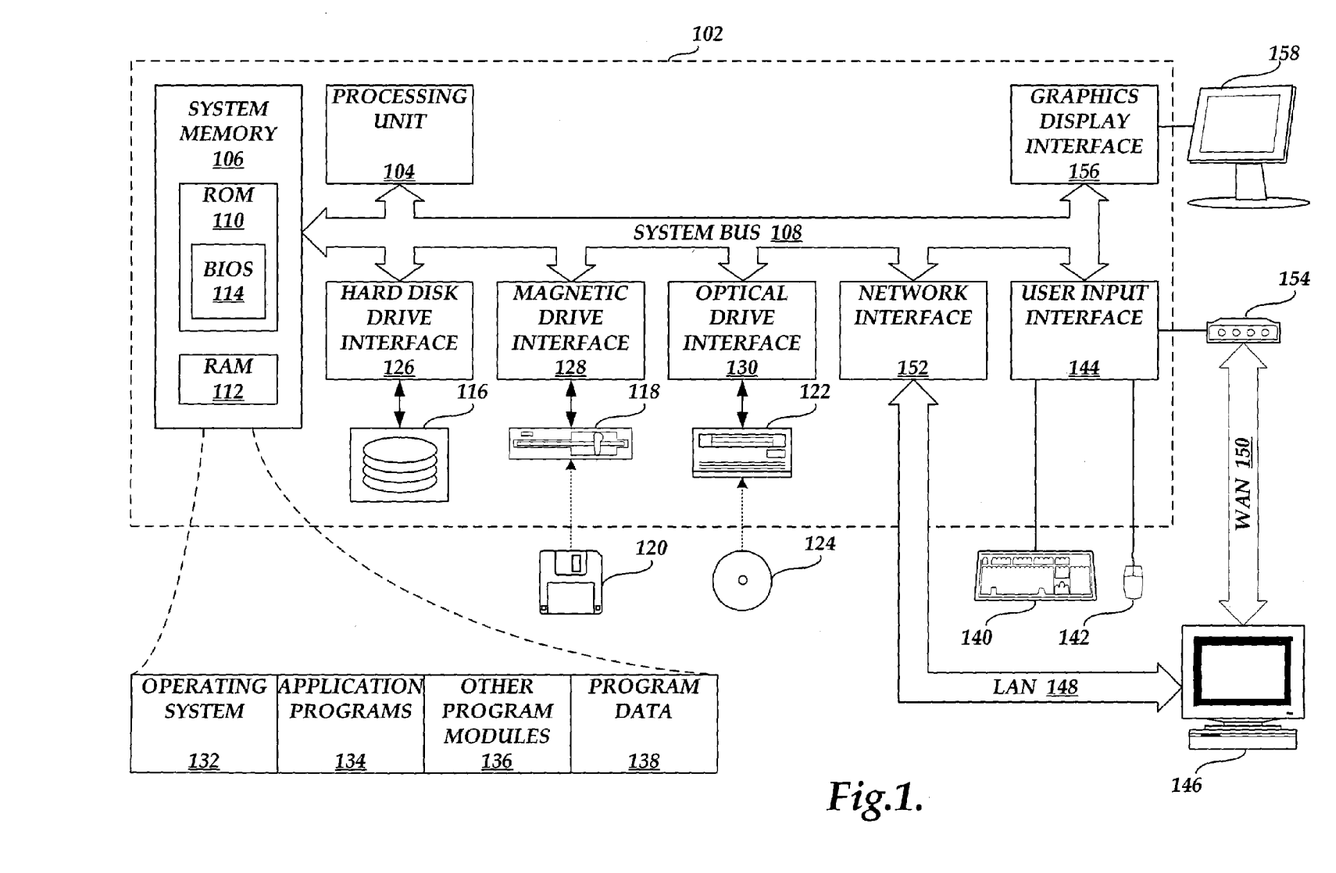
FIG. 1 is a block diagram of an exemplary computer system suitable for implementing aspects of the present invention.

FIG. 1 and the following discussion are intended to provide a brief, general description of a computing system suitable for implementing various aspects of the invention. While the computing system will be described in the general context of a personal computer usable in a distributed computing environment, where complementary tasks are performed by remote computing devices linked together through a communication network, those skilled in the art will appreciate that the invention may be practiced with many other computer system configurations, including multiprocessor systems, minicomputers, mainframe computers, and the like.

While aspects of the invention may be described in terms of application programs that run on an operating system in conjunction with a personal computer, those skilled in the art will recognize that those aspects also may be implemented in combination with other program modules. Generally, program modules include routines, programs, components, data structures, etc. that perform particular tasks or implement particular abstract data types.

With reference to FIG. 1, an exemplary system for implementing aspects of the invention includes a conventional personal computer 102, including a processing unit 104, a system memory 106, and a system bus 108 that couples the system memory to the processing unit 104. The system memory 106 includes read-only memory (ROM) 110 and random-access memory (RAM) 112. A basic input/output system 114 (BIOS), containing the basic routines that help to transfer information between elements within the personal computer 102, such as during startup, is stored in ROM 110. The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media.

The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk, and a CD-ROM disk, it should be appreciated by those skilled in the art that other types of media that are readable by a computer, such as magnetic cassettes, flash memory cards, digital video disks, Bernoulli cartridges, ZIP disks, and the like, may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touch pad, joystick, game pad, satellite dish, scanner, or the like. These and other input devices are often connected to the processing unit 104 through a user input interface 144 that is coupled to the system bus 108, but may be connected by other interfaces (not shown), such as a game port or a universal serial bus (USB). A display device 158 is also connected to the system bus 108 via a display subsystem that typically includes a graphics display interface 156 and a code module, sometimes referred to as a display driver, to interface with the graphics display interface. While illustrated as a stand-alone device, the display device 158 could be integrated into the housing of the personal computer 102. In addition to the elements illustrated in FIG. 1, personal computers may also include hardware devices (not shown), such as, but not limited to, hardware decryption devices, limiting switches, smart card readers, and the like.

The personal computer 102 may operate in a networked environment using logical connections to one or more remote computers, such as a remote computer 146. The remote computer 146 may be a server, a router, a peer computing device, or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, intranets, and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communication link between the computers may be used. In addition, the LAN 148 and WAN 150 may be used as a source of nonvolatile storage for the system.

Figure 2:
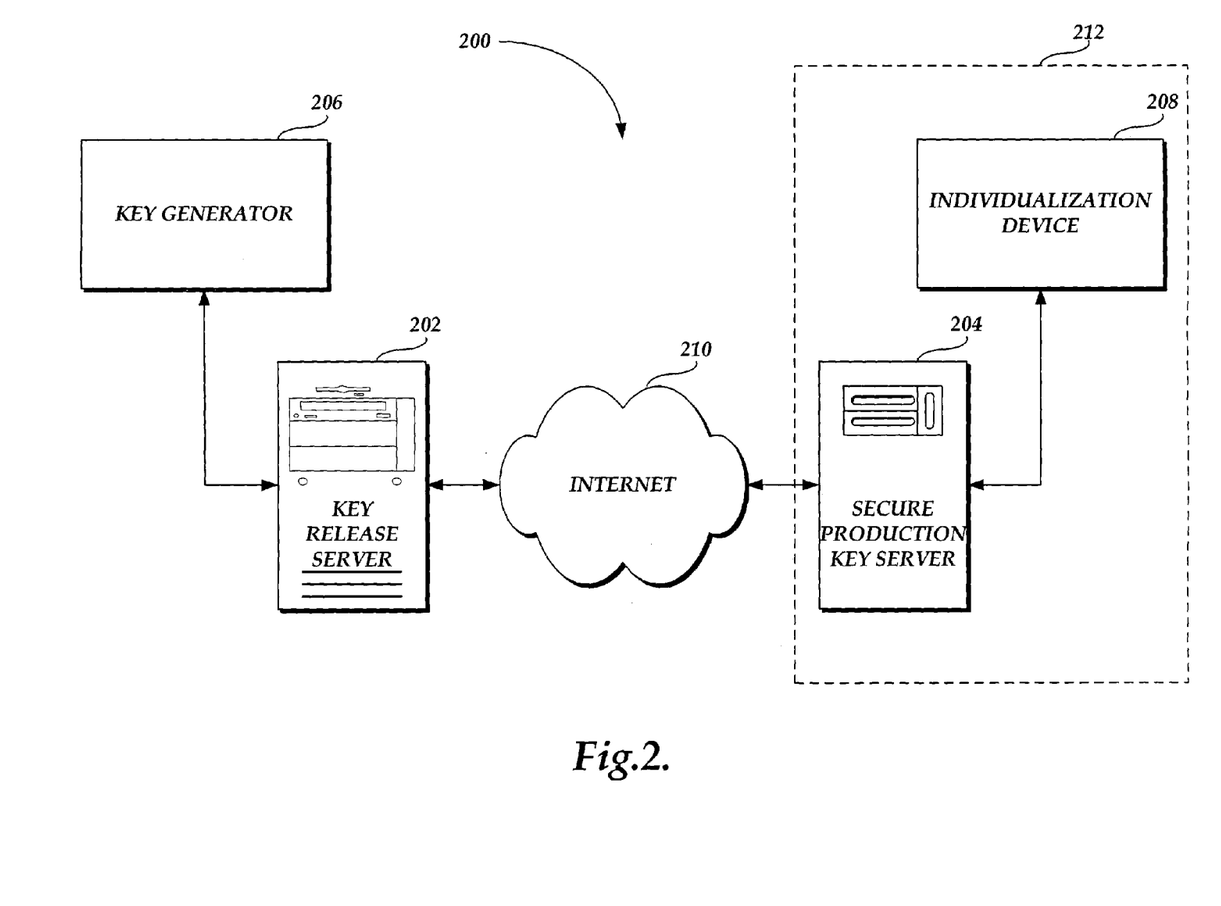
FIG. 2 is a pictorial diagram of an exemplary networked computing environment suitable for implementing aspects of the present invention.

FIG. 2 is a block diagram of an exemplary networked computing environment 200 suitable for implementing aspects of the present invention. The exemplary networked computing environment 200 includes a key release server 202, such as the personal computer 102 described above in regard to FIG. 1, connected to a production key server 204 over a communication network, such as the Internet 210.

Those skilled in the art will recognize that other communication networks may be used without departing from the scope of the present invention.

The key release server 202 is also connected to a key generator 206. The key generator 206 may be connected to the key release server 202 either directly or over a communication network, such as the Internet 210. Additionally, the key generator 206 may be a logical component and physically reside on the key release server 202 or some other computing device (not shown). The key generator 206 generates installation keys that are written to individualized installation media by an individualization device 208. The production key server 204 obtains installation keys from the key generator 206 via the key release server 202, and delivers them to the individualization device 208 in a secure manner.

In contrast to the connection between the key generator 206 and the key release server 202, and as will be discussed in greater detail below, the production key server 204 and the individualization device 208 are connected through a direct, physical connection. Accordingly, the production key server 204 and the individualization device 208 will typically be located in close proximity to each other, such as within the production facility, as indicated by box 212. It should be understood that the individualization device 208 may be a hardware device installed on, or connected to, the production key server 204 as part of the production key server, though typically the individualization device is a separate component. Using these components of the exemplary networked computing environment 200, and others, installation keys may be delivered from the key generator 206 to an individualization device 208 in the production facility 212 to be placed on installation media in a secure manner.

Figure 3:
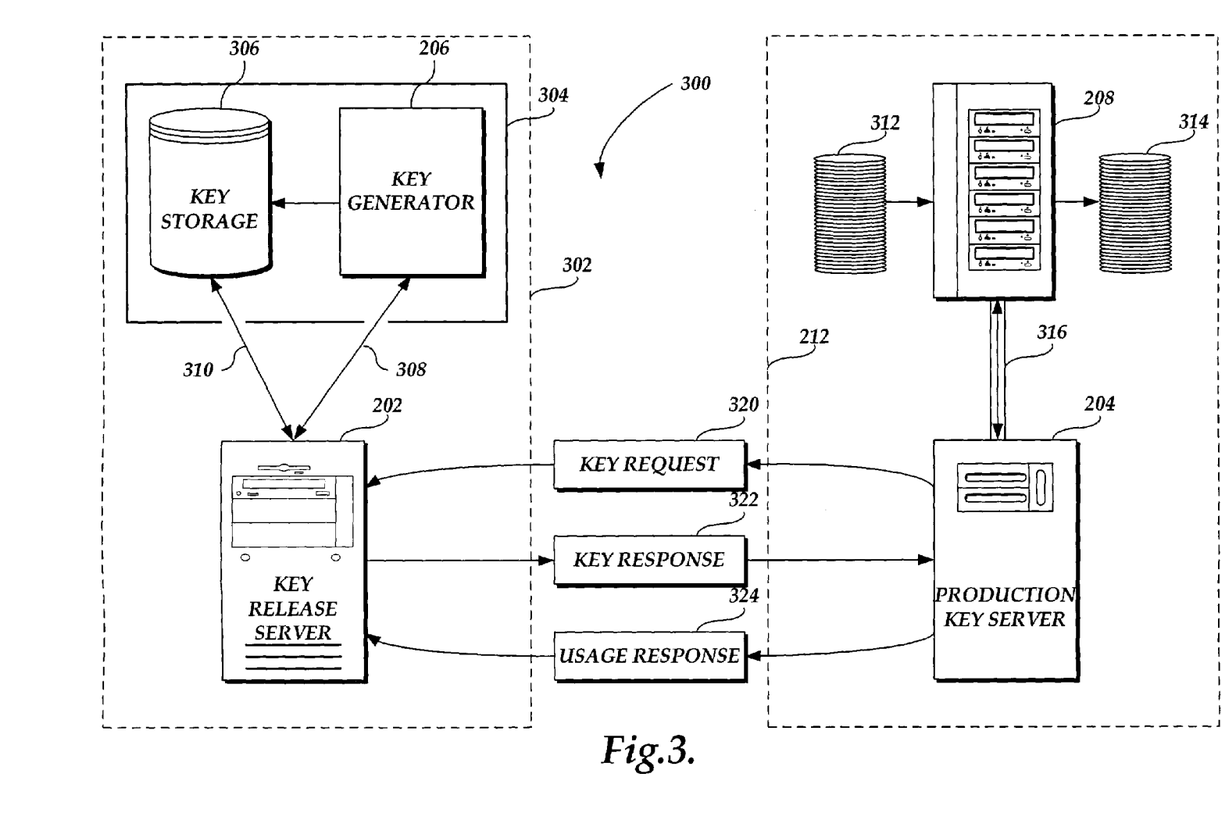
FIG. 3 is a pictorial diagram illustrating an exemplary system for delivering installation keys to an individualization device in a production facility in a secure manner.

FIG. 3 is a pictorial diagram illustrating an exemplary system 300 for delivering installation keys to an individualization device in a production facility 212 in a secure manner. In order to describe the components of the exemplary system 300, the system will be discussed in regard to its operation. The operation begins at the production key server 204, where one or more authorized operators initialize a production run. For purposes of this discussion, a "production run" refers to each time the exemplary system 300 is operated to individualize installation media.

As part of a production run, the production key server 204 delivers installation keys to the individualization device 208 for individualizing installation media bearing an installation image. Installation media bearing an installation image is hereafter referred to as intermediate installation media 312. Additionally, installation media bearing both the installation image and an installation key is referred to as individualized installation media 314. It is assumed, for illustration purposes, that the intermediate installation media 312 is available as a production run begins, although in an actual embodiment it may be made available simultaneously with, or as part of, the production run.

As previously mentioned, at least one authorized operator initiates the production run. As an initial part of the production run, the production key server 204 determines whether an operator is authorized according to an identification process. If the operator is not properly identified, or is identified but not authorized, the production run terminates without individualizing any installation media. According to one embodiment, the identification process is performed through the use of smart card technology. Smart card technology is known in the art and requires the operator to provide a hardware device, i.e., the smart card, to the production key server 204, and then authenticate himself or herself by entering a personal identification number (PIN) associated with the smart card. Presumably, the PIN is known only to operator to whom the smart card is issued. If the PIN is correct according to information on the smart card, the operator is deemed to be authorized. As an added layer of security, according to one embodiment, a production run requires two authorized operators to be identified, using smart cards and PINs or some other authentication technology. Other security aspects relating to the production key server 204 are described below in regard to FIG. 4.

Once enabled, the production key server 204 generates a key request 320 to a key release server 302 to request installation keys for the current production run. According to one embodiment, the production key server 204 does not keep installation keys between production runs. Thus, the production key server 204 must obtain an appropriate amount of installation keys to be processed for a production run. The number of installation keys may be manually entered by an operator, or may be determined automatically such as from a duplication device that produces the intermediate installation media 312. The present invention is not limited to any particular way of obtaining the number of installation keys.

In order to ensure that the request 320 for installation keys is from an authorized production key server 204, the request will typically include information identifying the production key server and the one or more operators who initiated the request. For example, the identifications of the one or more operators, as determined by the smart cards used to enable the production key server, are transmitted with the key request 320. Other alternatives for ensuring the authenticity of the key request 320 may also be used, such as digitally signing the request using well known digital signature techniques.

Upon receiving a key request 320, the key release server 202 determines the authenticity of the request. Determining the authenticity of the key request 320 depends on the type of information sent. For example, the key release server 202 may verify that the one or more operators that initiated the process are authorized to initiate the process on the production key server 204. Alternatively, the key request 320 may be determined according to the digital signature used to sign the request. If the key release server 202 is satisfied that the key request 320 is authentic, the key release server obtains the requested number of installation keys from the key generator 206.

The key release server 202 may directly request authentication keys from the key generator 206, as indicated by arrow 308. In response, the key generator 206 may generate installation keys and return them to the key release server 202. Alternatively, the key generator 206 may generate the keys and store them in the key storage database 306, from where the key release server 202 may retrieve them, as indicated by arrow 310. As a further alternative, the key generator 206 may generate keys anticipatorily and store them in the key storage database 306. The key release server 202 would then retrieve the appropriate number of keys from the key storage database 306 and notify the key generator 206 that they were retrieved. Other variations may also be utilized.

As illustrated in FIG. 3, as an added measure of security, the key generator 206 and the key storage database 306 are stored in a secure, physical location 304. Only authorized personnel are granted access to the secure location 304 as the algorithms and data for generating the installation keys must be kept secret. The consequences of unscrupulous people obtaining this information could be problematic to a vendor. As previously mentioned, the key release server 202 may or may not be physically connected to the key generator 206 or the key storage database 306. Thus, while the key release server 202 may be located at the same vendor facility with the key generator 206 and key storage database 306, as illustrated by box 302 in FIG. 3, the key release server may alternatively be connected from a remote location and communicate over a communication network such as the Internet 210.

After obtaining the installation keys from the key generator 206, either directly or indirectly through the key storage database 306, the key release server 202 transmits the installation keys to the production key server 204 in a key response 322. When communicating over the Internet 210 and because of the vulnerability of the installation keys while in transit, the installation keys are delivered to the production key server using the secure socket layer (SSL), which is known in the art. However, while SSL provides a certain level of encryption between the two computers, SSL is susceptible to interception and break-ins by a third party. Thus, according to aspects of the invention, the installation keys are strongly encrypted before they are transmitted in the key response 322 to the production key server 204. In one embodiment, the production key server 204 contains a hardware decryption device and the installation keys are encrypted in such a manner as to be decryptable by the hardware decryption device. By using a hardware decryption device contained in the production key server 204, the one or more authorized operators are not aware of how to decrypt the installation keys, thereby ensuring that they will not be a means of illicitly obtaining decrypted installation keys. Further, a hardware decryption device may be selected that uses encryption/decryption keys that cannot be easily broken.

As previously mentioned, according to one embodiment, the production key server 204 does not store installation keys between production runs. Thus, after receiving the installation keys in the key response 322, the production key server 204 is ready to deliver the keys to the individualization device 208 to be written to the intermediate installation media 312. The production key server 204 may decrypt all of the encrypted installation keys together. Alternatively, as an added layer of security, rather than decrypting the installation keys at one time, the production key server 204 may decrypt the installation keys as the individualization device 208 requires them, in a so called just-in-time fashion. Thus, as the individualization device 208 is ready to individualize an intermediate installation media 312, the individualization device 208 makes a request for an installation key from the production key server 206. The production key server 206 decrypts an installation key from those delivered in the key response 322, and returns it to the individualization device 208.

The individualization device 208 writes the installation key to the intermediate installation media 312, thereby generating an individualized installation media 314. As some media is prone to failure (typically a small percentage fails) the individualization device 208, or some other component (not shown), validates that the installation key may be read from the individualized installation media 314. A report is sent to the production key server 204 indicating whether the installation key is readable. In one embodiment of the invention, unused installation keys, i.e., those keys written to installation media that cannot be subsequently validated, are not reused, providing a further layer of security. As an additional aspect of the invention, as a further measure of security, any installation media that is not validated is destroyed. The production key server 204 keeps track of the used and unused installation keys.

At the end of the production run, the product key server 204 generates a usage response 324 indicating which installation keys were used and which were not used, and transmits the usage response to the key release server 202. As with the key response 322, this information is typically encrypted before being transmitted to the key release server 202. Additionally, this response will typically be transmitted using SSL over the Internet 210. The usage information may be subsequently used by an installation process to limit the installation of the content to authorized installations, as described in co-pending application "System and Method for Individualizing Installation Media".

Figure 4:
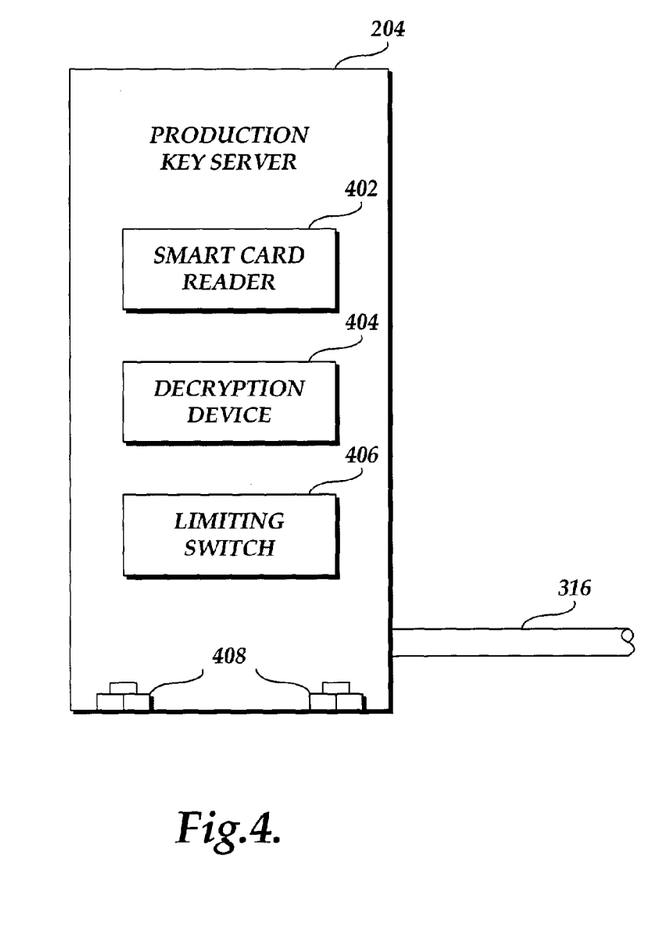
FIG. 4 is a pictorial diagram illustrating various security aspects of a production key server.

Because the production key server 204 is typically located at the production facility 212, it will likely be a target through which others may attempt to gain access to installation keys. Accordingly, certain security aspects may be employed to ensure that the production key server 204 remains secure in the production facility 212, some of which have already been mentioned. FIG. 4 is a block diagram illustrating exemplary security aspects of a production key server 204.

As previously mentioned, the production key server 204 may authenticate one or more operators via a smart card and associated pin. Accordingly, the production key server 204 may include a smart card reader 402 to read an operator's smart card and validate the operator's PIN. Also previously mentioned, the production key server 204 may include a hardware decryption device 404. Hardware decryption devices, such as device 404, are known in the art, and would be used to decrypt encrypted installation keys received in a key response 322.

The production key server 204 may also include a limiting switch 406, as known in the art. A limiting switch 406 is a hardware switch that once engaged, may be disengaged, but not reengaged. The limiting switch is coupled to the production key server's enclosing case such that it is engaged when the case is put together as an operational production key server 204. The limiting switch may be further associated to various devices within the production key server 204, such as the hardware decryption device 404, or the processing unit 104 (FIG. 1). Other components within the production key server 204 may also be tied to the limiting switch 406. Any component associated with the limiting switch 406 may operate so long as the limiting switch is engaged. However, opening the production key server's case disengages the limiting switch 406. Because the limiting switch 406 cannot be reengaged, any component associated with the limiting switch will similarly be disabled.

As another security measure, and because thieves may target the entire production key server 204, the production key server is bolted to the floor, as illustrated by connections 408. Alternatively, the production key server 204 may be bolted to a wall or some other permanent surface. By bolting the production key server 204 to the floor from within the production key server's enclosing case, the bolting to the floor can be tied to the limiting switch 406. In other words, unbolting the production key server 204 from its attached surface must be performed from within the enclosing case, but opening the enclosing case disables all of the components associated with the limiting switch 406.

As an additional security measure, the production key server 204 and the individualization device are physically connected. This is a direct, physical connection 316 because un-encrypted installation keys are delivered from the production key server 204 to the individualization device 208, and information flowing over a communication network can be stolen. Additionally, the direct, physical connection 316 is contained in a hardened, shielded conduit to prevent tapping.

It should be understood that any or all of the above described security measures may be employed to secure the delivery of installation keys from a key generator 206 to an individualization device 208. Those skilled in the art will also recognize that other, additional measures may be utilized, such as additional encryption layers, digital signing information, hardware security keys, sometimes referred to as dongles, and the like, to ensure secure delivery of the installation keys without departing from the scope of the present invention.

Figure 5:
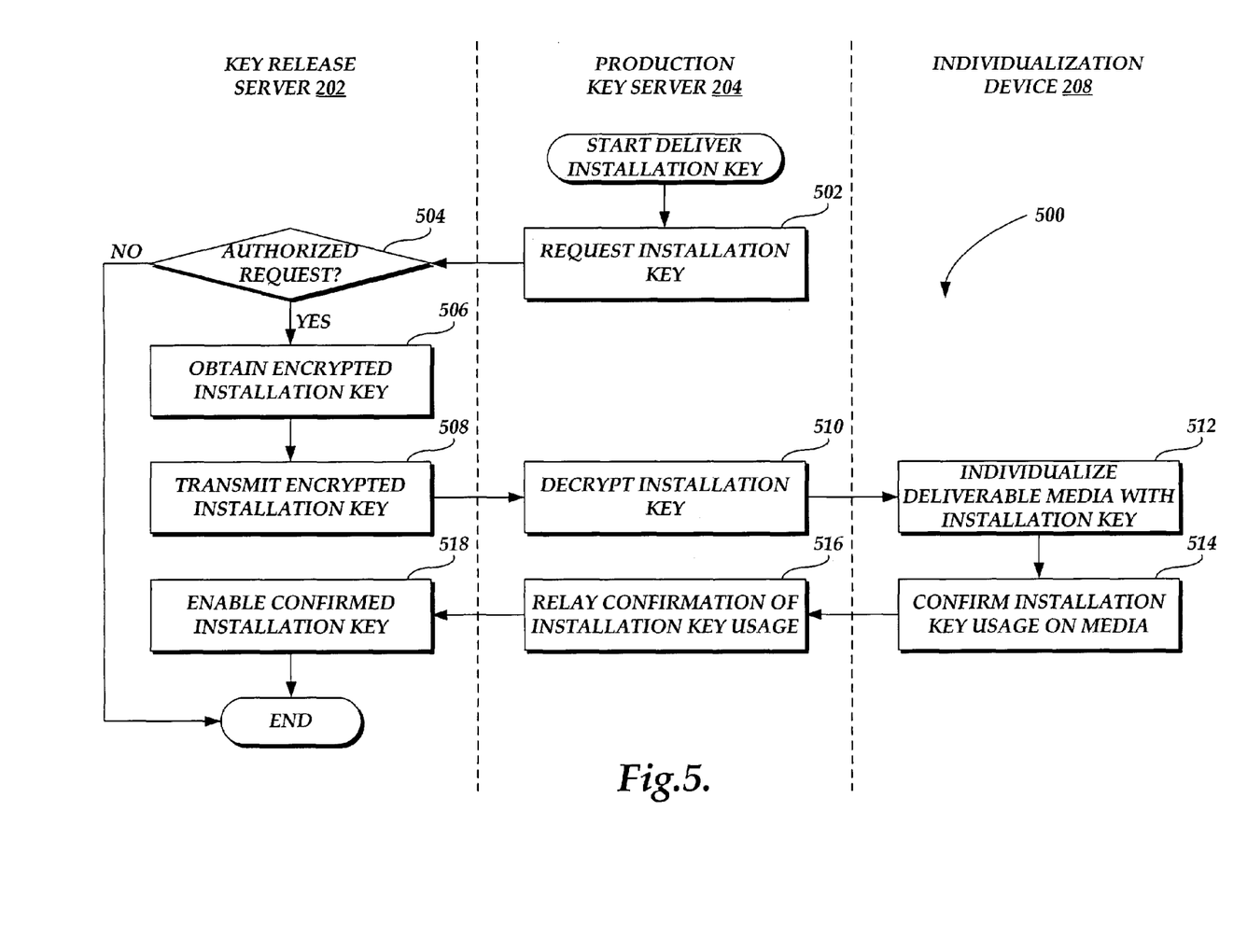
FIG. 5 is a flow diagram illustrating an exemplary routine for delivering an installation key to an individualization device at a production facility for individualizing installation media in a secure manner.

FIG. 5 is a flow diagram illustrating an exemplary routine 500 for delivering an installation key to an individualization device 208, located at a production facility 212, for individualizing installation media in a secure manner. Beginning at block 502, a key request 320 is made for an installation key from a production key server 204. While the discussion of FIG. 5 will be made in terms of requesting a single installation key, it is for illustration purposes only, and should not be construed as limiting upon the present invention. As previously discussed, typically, a number of installation keys will be requested, according to the size of a production run.

The key release server 202, after receiving the key request 320, determines whether the key request is an authorized request at decision block 504. As previously discussed, in order to determine whether the key request 320 is an authorized request, authorization information is provided with, or as part of, the key request. For example, the key request 320 may identify the one or more operators at the production key server 204 that initiated the request. Alternatively, the key request 320 may be accompanied with a digital certificate or encrypted token that may be generated only by the production key server 204. Other authentication techniques may also be used, and the present invention should not be construed as limited to any particular technique.

If, at decision block 504, the request is not authorized, the routine 500 terminates, meaning that no installation key is delivered to the production key server 204. Alternatively, if the key request 320 is authorized, at block 506, the key release server 202 obtains an encrypted installation key from the key generator 206, as described above in regard to FIG. 3. Additionally, it should be understood that the key release server 202 may alternatively obtain the installation key from the key generator 206 in a un-encrypted format, and encrypt it prior to sending it to the production key server 204. Further, both the key generator 206 and the key release server 202 may encrypt the installation key, thereby providing multiple layers of encryption and making the installation key ever more difficult to intercept or steal.

At block 508, the installation key is transmitted to the production key server 204 in key response 322, as described above in regard to FIG. 3. At block 510, the installation key is decrypted in a just-in-time manner for the individualization device 208 and sent to the individualization device. At block 512, the individualization device writes the installation key to the intermediate installation media 312, thereby generating individualized installation media 314. At block 514, the individualization device, or some other related device, determines whether the individualized installation media 314 is readable or not and reports this to the production key server 204. At block 516, the production key server 204 transmits a usage response 324 to the key release server 202, that uses the information in the usage response to enable the individualized installation media to be installed as an authorized installation. Thereafter, the routine 500 terminates.

Figure 6:
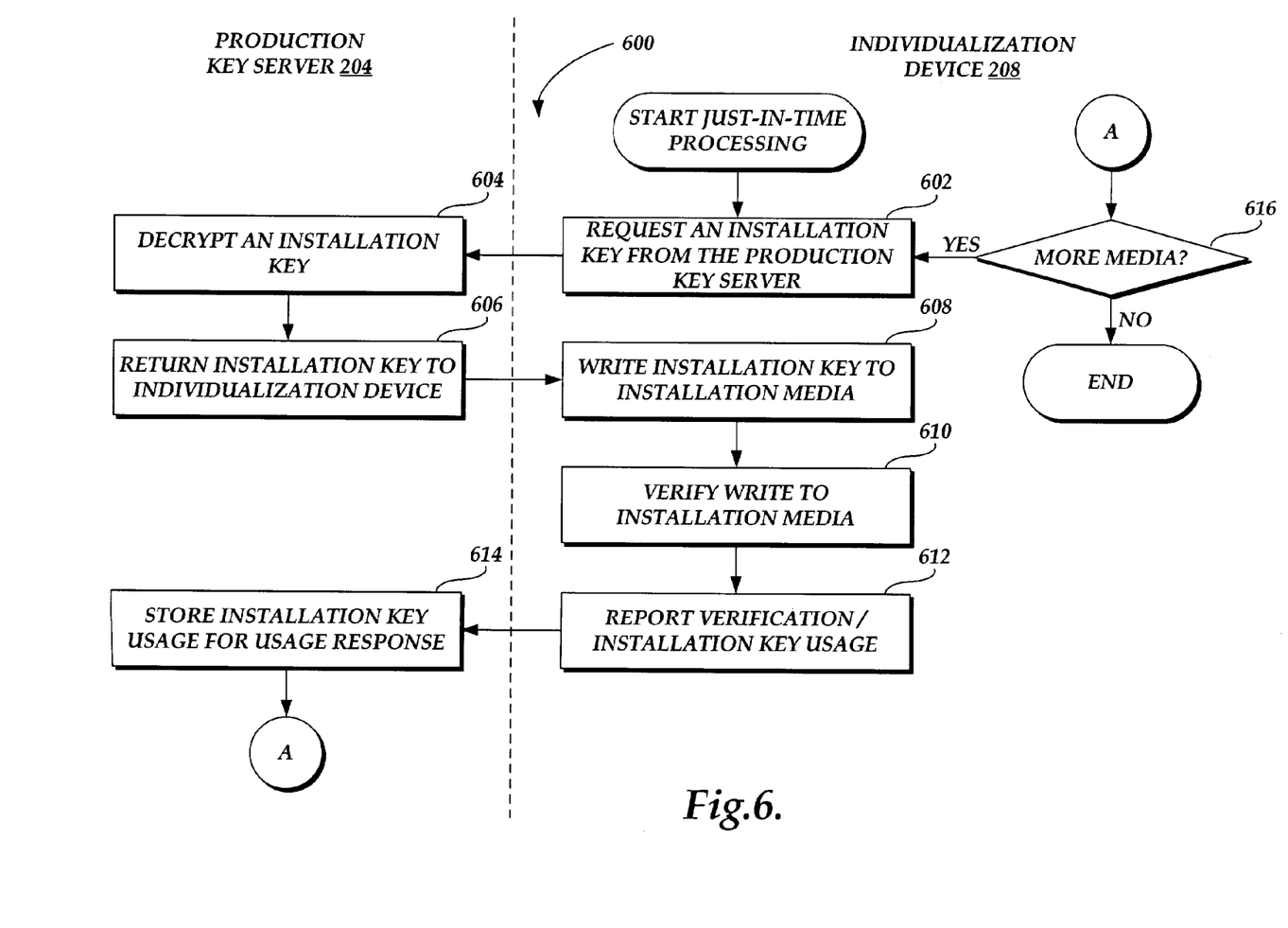
FIG. 6 is a flow diagram illustrating an exemplary routine for processing a plurality of encrypted installation keys to an individualization device in a just-in-time manner.

While FIG. 5 is described in terms of processing a single installation key, FIG. 6 is a flow diagram illustrating an exemplary routine for processing a plurality of installation keys to an individualization device in a just-in-time manner. This exemplary routine 600 assumes that the production key server 204 has already obtained the installation keys, in an encrypted format, as previously described in regard to FIGS. 3 and 5. Beginning at block 602, the individualization device 208 is ready to write an installation key to an intermediate installation media 312 and requests an installation key from the production key server 204. At block 604, the production key server 204 decrypts an installation key from those obtained from the key release server 202, as previously described. It should be understood that installation keys are typically used only once. At block 606, the production key server 204 returns the decrypted installation key to the individualization device 208.

At block 608, the individualization device 208 writes the installation key to the intermediate installation media 312, thereby generating individualized installation media 314. Writing installation keys to installation media is described in greater detail in regard to co-pending patent application "System and Method for Individualizing Installation Media" noted above. At block 610, the individualized installation media 314 is verified to ensure that the information thereon, including the installation key, is readable. At block 612, a report is generated and returned to the production key server 204 indicating whether the individualized installation media 314 is readable. If the individualized installation media 314 is readable within normal tolerances, the installation key written to that media 314 is considered to have been used when the production key server 204 reports to the key release server 202. Alternatively, if the individualized installation media 314 is not readable, within normal tolerances, the installation key is considered to have not been used. However, according to one embodiment, unused installation keys are not recycled by the production key server 204 during a production run. At block 614, the production key server 204 records whether the installation key has been used or not, which is later reported to the key release server 202 when generating the usage response 324, as described above in regard to FIGS. 3 and 5.

At decision block 616, the individualization device 208 determines whether there is any more intermediate installation media 312 to be individualized in the current production run. If there is more intermediate installation media 312 to be individualized, the routine returns again to block 602 to obtain another installation key. This process repeats until, at decision block 616, the intermediate installation media 312 for the current production run is exhausted. Thereafter, the routine 600 terminates.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for securely delivering an installation key to an individualization device adapted for the manufacture of computer readable media, the system comprising:

an individualization device;

a key generator operable to generate one or more installation keys, then encrypt the installation keys; and a production key server operable to obtain the encrypted installation keys from the key generator, decrypt the encrypted installation keys, and deliver the decrypted installation keys to the individualization device;

wherein the individualization device is operable to write each decrypted installation key onto an individual installation media containing installable content, and wherein an installation process for the installable content is operable to read the installation key from the installation media thereby enabling the installation of the installable content from the installation media onto a target computer system without user intervention.

2. The system of claim 1, wherein the production key server obtains the installation key from the key generator after being enabled to do so by an operator.

3. The system of claim 2, wherein the production key server is enabled by the operator by authenticating the identity of the operator.

4. The system of claim 3, wherein the production key server authenticates the identity of the operator according to information read from a smart card and an operator-entered personal identification number.

5. The system of claim 3 further comprising a key release server, and wherein the production key server obtains the installation key from the key generator via the key release server.

6. The system of claim 2, wherein the production key server obtains the installation key from the key generator by sending a key request to the key release server.

7. The system of claim 6, wherein the key release server validates whether the key request is authorized, such that only if the key request is authorized does the production key server obtain the installation key.

8. The system of claim 7, wherein the key request contains information authenticating the identity of the production key server, and wherein the key release server validates whether the key request is authorized according to the authenticated identity of the production key server such that only certain authenticated production key servers are authorized.

9. The system of claim 7, wherein the key request contains information identifying the operator, and wherein the key release server validates whether the key request is authorized according to the information identifying the operator, such that only certain identified operators are authorized.

10. The system of claim 7, wherein the key release server obtains the installation key from the key generator and sends the installation key to the production key server in an encrypted format.

11. The system of claim 10, wherein the key generator encrypts the installation key.

12. The system of claim 10, wherein the key release server encrypts the installation key.

13. The system of claim 10, wherein the key generator encrypts the installation key, and wherein the key release server also encrypts the installation key.

14. The system of claim 10, wherein the key release server sends the installation key to the production key server in an encrypted format over the Internet using a secure sockets layer (SSL).

15. The system of claim 6 further comprising a key storage database, wherein the key release server obtains the installation key from the key generator by retrieving it from the key storage database, and wherein the key generator generates the installation key and stores it in the key storage database until the key release server retrieves it.

16. The system of claim 15, wherein the key generator encrypts the installation key and stores the installation key in the key storage database in its encrypted format.

17. The system of claim 6, wherein the production key server includes a hardware decryption device, and wherein the production key server decrypts the encrypted installation key using the hardware decryption device.

18. The system of claim 17, wherein the production key server includes a limiting switch such that any attempts to open or modify the production key server permanently disables the limiting switch.

19. The system of claim 18, wherein the production key server is rendered inoperable when the limiting switch is disabled.

20. The system of claim 19, wherein the production key server is affixed to a surface using attachments secured within the production key server.

21. The system of claim 20, wherein the production key server is connected to the individualization device via a direct connection.

22. The system of claim 21, wherein the direct connection is encased in a hardened conduit.

23. The system of claim 6, wherein the production key server obtains a plurality of installation keys from the key generator in an encrypted format according to the number of installation media to be individualized in a production run.

24. The system of claim 23, wherein the production key server decrypts an installation key from the plurality of installation keys in a just-in-time manner as to when the individualization device is ready to write an installation key to an installation media.

25. The system of claim 23, wherein the key request includes the number of keys to be obtained according to the number of installation media to be individualized in the production run.

26. The system of claim 23, wherein the individualization device determines whether each installation key written to the installation media during a production run is readable, and reports this information to the production key server.

27. The system of claim 26, wherein the production key server sends a usage response to the key release server identifying which installation keys written to installation media are readable, and which are not.

28. A method for securely delivering an installation key to an individualization device adapted for the manufacture of computer readable media, the method comprising:
receiving an encrypted unique installation key;
decrypting the encrypted unique installation key;
delivering the decrypted unique installation key to an individualization device; and
writing the decrypted unique installation key onto an installation media that includes installable content, wherein the installation key is read from the installation media by an installation process to enable installing the installable content from the installation media onto a target computer device without user intervention.

29. The method of claim 28 further comprising requesting an installation key, and wherein receiving an encrypted installation key further comprises receiving an encrypted installation key in response to the request for an installation key.

30. The method of claim 29 further comprising authenticating an operator such that the request for an installation key is made only if the operator is authenticated.

31. The method of claim 30, wherein authenticating an operator comprises reading information from a smart card and validating the information with an operator-entered personal identification number.

32. The method of claim 30 further comprising validating the request for an installation key to determine whether the request is an authorized request, and receiving an encrypted installation key in response to the request only if the request is an authorized request.

33. The method of claim 32, wherein requesting an installation key includes providing location identification information, and wherein validating the request for an installation key to determine whether the request is an authorized request comprises determining whether the location corresponding to the location identification information is an authorized location.

34. The method of claim 32, wherein requesting an installation key includes operator identification information, and wherein validating the request for an installation key to determine whether the request is an authorized request comprises determining whether the operator corresponds to an authorized operator.

35. The method of claim 29 further comprising requesting a plurality of installation keys, the number of which corresponding to the number of installation media to be individualized in a production run.

36. The method of claim 35 further comprising receiving a plurality of encrypted installation keys in response to the request for a plurality of installation keys.

37. The method of claim 36 further comprising, in response to repeated requests from the individualization device, decrypting an installation key from the plurality of encrypted installation keys, and delivering the decrypted installation key to the individualization device for writing the installation key onto installation media.

38. A system for individualizing installation media with installation keys delivered in a secure manner, the system comprising:
    an individualization device operable to write a unique installation key onto an installation media containing installable content, wherein the installation key is read from the installation media by an installation process to enable installation of the installable content from the installation media onto a target computer device without any input by a user; and
    a production key server operable to obtain the installation key from a key generator in an encrypted format, decrypts the encrypted installation key, and delivers the decrypted installation key to the individualization device.

39. The system of claim 38, wherein the production key server obtains the installation key from the key generator after being enabled to do so by an operator.

40. The system of claim 39, wherein the production key server is enabled by the operator by authenticating the identity of the operator.

41. The system of claim 40, wherein the production key server authenticates the identity of the operator according to information read from a smart card and an operator-entered personal identification number.

42. The system of claim 40, wherein the production key server obtains the installation key from the key generator via a key release server.

43. The system of claim 42, wherein the production key server obtains the installation key from the key release server via the Internet.

44. The system of claim 43, wherein the production key server obtains the installation key from the key release server via the Internet using a secure sockets layer (SSL).

45. The system of claim 42, wherein the production key server obtains the installation key from the key release server in response to a key request sent by the production key server.

46. The system of claim 45, wherein the production key server obtains the installation key from the key release server only if the key request is an authorized request.

47. The system of claim 46, wherein the key request includes authorization information that is used to determine whether the key request is an authorized request.

48. The system of claim 47, wherein the authorization information includes data identifying the operator, and wherein the key request is an authorized request if the identified operator is an authorized operator according to the key release server.

49. The system of claim 38, wherein the production key server includes a hardware decryption device, and wherein the production key server decrypts the encrypted installation key using the hardware decryption device.

50. The system of claim 49, wherein the production key server further includes a limiting switch such that any attempts to open or modify the production key server permanently disables the limiting switch.

51. The system of claim 50, wherein the production key server is rendered inoperable when the limiting switch is disabled.

52. The system of claim 51, wherein the production key server is affixed to a surface using attachments secured within the production key server.

53. The system of claim 52, wherein the production key server is connected to the individualization device via a direct connection.

54. The system of claim 53, wherein the direct connection is encased in a hardened conduit.

55. The system of claim 38, wherein the production key server obtains a plurality of installation keys from the key generator in an encrypted format according to the number of installation media to be individualized in a production run.

56. The system of claim 55, wherein the production key server decrypts an installation key from the plurality of installation keys in a just-in-time manner according to when the individualization device is ready to write an installation key to an installation media.

57. The system of claim 56, wherein the individualization device determines whether each installation key written to the installation media during a production run is readable, and reports this information to the production key server.

58. The system of claim 57, wherein the production key server sends a usage response identifying which installation keys written to installation media are readable, and which are not.

59. A system for securely delivering an installation key to an individualization device adapted for the manufacture of computer readable media, the system comprising:
    a key generator operable to generate a unique installation key, wherein the installation key enables an installation process to install content from installation media onto a target computer device; and
    a key release server operable to obtain the installation key from the key generator in response to a key request, and delivers the installation key in an encrypted format to the individualization device, the individualization device operable to decrypt the encrypted installation key and write the decrypted installation key onto the installation media and write the decrypted installation key onto the installation media, and wherein an installation process for the installable content is operable to read the installation key from the installation media thereby enabling the installation of the installable content from the installation media onto a target computer system without user intervention.

60. The system of claim 59, wherein the key release server delivers the installation key to the individualization device via a production key server, and wherein the production key server decrypts the encrypted installation key for the individualization device before the installation key is written to installation media.

61. The system of claim 60, wherein the key release server delivers the installation key to the individualization device via a production key server if the key request is an authorized request.

62. The system of claim 61, wherein the key request includes information identifying an operator, and wherein the key request is an authorized request if the operator is an authorized operator.

63. The system of claim 61, wherein the key release server encrypts the installation key.

64. The system of claim 61, wherein the key generator encrypts the installation key.

65. The system of claim 61, wherein the key release server and the key generator encrypt the installation key.

66. The system of claim 61, wherein the key release server delivers the installation key to the individualization device via a production key server over the Internet.

67. The system of claim 66, where the key release server delivers the installation key to the individualization device via a production key server over the Internet using a secure sockets layer (SSL).

68. The system of claim 61 further comprising a key storage database, wherein the key release server obtains the installation key from the key generator by retrieving it from the key storage database, and wherein the key generator generates the installation key and stores it in the key storage database until the key release server retrieves it.

69. The system of claim 68, wherein the key generator encrypts the installation key and stores the installation key in the key storage database in its encrypted format.

70. The system of claim 61, wherein the key request includes a plurality of installation keys to be obtained, and wherein the plurality of installation keys are delivered in an encrypted format.

71. An individualized installation medium prepared by a process comprising:

receiving an encrypted unique installation key;

decrypting the encrypted unique installation key;

delivering the decrypted unique installation key to an individualization device; and writing the decrypted unique installation key to an installation medium containing installable content, wherein the decrypted unique installation key is read from the installation medium by an installation process to enable installing the installable content from the installation medium onto a target computer device without user intervention.

* * * * *